US012327255B2

(12) United States Patent
Zhang et al.

(10) Patent No.: US 12,327,255 B2
(45) Date of Patent: Jun. 10, 2025

(54) DEVICE MANAGEMENT BASED ON BLOCKCHAIN NETWORK

(71) Applicant: Tencent Technology (Shenzhen) Company Limited, Guangdong (CN)

(72) Inventors: Jinming Zhang, Shenzhen (CN); Jun Zhou, Shenzhen (CN); Runzeng Guo, Shenzhen (CN); Shaoming Wang, Shenzhen (CN); Shiyou Sun, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 282 days.

(21) Appl. No.: 18/071,890

(22) Filed: Nov. 30, 2022

(65) Prior Publication Data
US 2023/0092275 A1 Mar. 23, 2023

Related U.S. Application Data

(63) Continuation of application No. PCT/CN2022/073349, filed on Jan. 24, 2022.

(30) Foreign Application Priority Data

Feb. 2, 2021 (CN) .......................... 202110143735.X

(51) Int. Cl.
*G06F 21/44* (2013.01)
*G06Q 20/38* (2012.01)
*G06Q 20/40* (2012.01)
(52) U.S. Cl.
CPC ........... *G06Q 20/409* (2013.01); *G06F 21/44* (2013.01); *G06Q 20/389* (2013.01); *G06Q 20/40145* (2013.01)

(58) Field of Classification Search
CPC .......................... G06Q 20/409; G06Q 20/322; G06F 20/3263; G06F 21/44
See application file for complete search history.

(56) References Cited

U.S. PATENT DOCUMENTS

2020/0235911 A1* 7/2020 Safak .................... H04L 9/3247
2020/0403986 A1 12/2020 Gosalia

FOREIGN PATENT DOCUMENTS

CN 109327457 A 2/2019
CN 109660330 A 4/2019
(Continued)

OTHER PUBLICATIONS

International Search Report and Written Opinion in PCT/CN2022/073349, mailed Apr. 19, 2022, 12 pages.
(Continued)

*Primary Examiner* — Ellen Tran
(74) *Attorney, Agent, or Firm* — ArentFox Schiff LLP

(57) ABSTRACT

In a method, device information of a characteristic acquisition device associated with a target terminal is acquired in response to a triggering operation for establishing an association relationship between the characteristic acquisition device and a target client in the target terminal. The device information is transmitted to the blockchain network such that each of node devices in the blockchain network authenticates the characteristic acquisition device according to the device information. A respective reference authentication result generated by each of the node devices is acquired. The respective reference authentication result indicates whether the characteristic acquisition device passes authentication of the respective node device. The association relationship between the target client and the characteristic acquisition device is established in response to the characteristic acqui- (Continued)

sition device passing the authentication according to the reference authentication results.

20 Claims, 8 Drawing Sheets

(56) References Cited

FOREIGN PATENT DOCUMENTS

| | | |
|---|---|---|
| CN | 111027036 A | 4/2020 |
| CN | 112465516 A | 3/2021 |

OTHER PUBLICATIONS

Supplementary European Search Report issued Jul. 26, 2023 in Application No. 22748906.9 ( 10 pages).

* cited by examiner

DEVICE MANAGEMENT BASED ON BLOCKCHAIN NETWORK

RELATED APPLICATIONS

This application is a continuation of International Application No. PCT/CN2022/073349, entitled "BLOCKCHAIN NETWORK-BASED DEVICE MANAGEMENT METHOD, RELATED DEVICE, AND STORAGE MEDIUM," filed on Jan. 24, 2022, which claims priority to Chinese Patent Application No. 202110143735.X, entitled "DEVICE MANAGEMENT METHOD BASED ON BLOCKCHAIN NETWORK, RELATED DEVICES AND STORAGE MEDIUM" and filed on Feb. 2, 2021. The entire disclosures of the prior applications are hereby incorporated by reference.

FIELD OF THE TECHNOLOGY

This application relates to the field of computer technologies and blockchain technologies, including a device management technology based on a blockchain network.

BACKGROUND OF THE DISCLOSURE

Along with the development of computer technologies, mobile payments are seen everywhere in daily life of people, for example, merchants can directly achieve commodity payments according to fingerprint characteristics or facial images or other data provided by users.

At present, in a facial recognition payment scenario, a characteristic acquisition device for collecting facial images can correspond to a payment client running in a terminal, if a plurality of different payment clients need to run on the terminal, a plurality of characteristic acquisition devices corresponding to the plurality of payment clients need to be installed, thereby causing a problem of inconvenient payments for the merchants and the users, and thus, how to adopt one characteristic acquisition device to support operation of the different clients included in the terminal becomes a current research hotspot.

SUMMARY

Embodiments of the disclosure provide a device management method based on a blockchain network, related devices and a storage medium, and one characteristic acquisition device is adopted to support operation of different clients included in a terminal, thereby reducing configurations of the characteristic acquisition device and improving convenience.

According to an aspect of the disclosure, a method of device management based on a blockchain network device is provided. In the method, device information of a characteristic acquisition device associated with a target terminal is acquired in response to a triggering operation for establishing an association relationship between the characteristic acquisition device and a target client in the target terminal. The characteristic acquisition device is configured to collect characteristic information of a user. The association relationship indicates a data communication connection between the characteristic acquisition device and the target terminal. The device information is transmitted to the blockchain network such that each of node devices in the blockchain network authenticates the characteristic acquisition device according to the device information. A respective reference authentication result generated by each of the node devices is acquired. The respective reference authentication result indicates whether the characteristic acquisition device passes authentication of the respective node device. The association relationship between the target client and the characteristic acquisition device is established in response to the characteristic acquisition device passing the authentication according to the reference authentication results.

According to another aspect of the disclosure, an apparatus is provided. The apparatus includes processing circuitry. The processing circuitry is configured to acquire device information of a characteristic acquisition device that is associated with a target terminal in response to a triggering operation for establishing an association relationship between the characteristic acquisition device and a target client in the target terminal. The characteristic acquisition device is configured to collect characteristic information of a user. The association relationship indicates a data communication connection between the characteristic acquisition device and the target terminal. The processing circuitry is configured to transmit the device information to a blockchain network such that each of node devices in the blockchain network authenticates the characteristic acquisition device according to the device information. The processing circuitry is configured to acquire a respective reference authentication result generated by each of the node devices, where the respective reference authentication result indicates whether the characteristic acquisition device passes authentication of the respective node device. The processing circuitry is configured to establish the association relationship between the target client and the characteristic acquisition device in response to the characteristic acquisition device passing the authentication according to the reference authentication results.

Aspects of the disclosure also provide a non-transitory computer-readable medium storing instructions which, when executed by at least one processor, cause the at least one processor to perform a method of device management based on a blockchain network device. In the method, device information of a characteristic acquisition device associated with a target terminal is acquired in response to a triggering operation for establishing an association relationship between the characteristic acquisition device and a target client in the target terminal. The characteristic acquisition device is configured to collect characteristic information of a user. The association relationship indicates a data communication connection between the characteristic acquisition device and the target terminal. The device information is transmitted to the blockchain network such that each of node devices in the blockchain network authenticates the characteristic acquisition device according to the device information. A respective reference authentication result generated by each of the node devices is acquired. The respective reference authentication result indicates whether the characteristic acquisition device passes authentication of the respective node device. The association relationship between the target client and the characteristic acquisition device is established in response to the characteristic acquisition device passing the authentication according to the reference authentication results.

In the embodiments of the disclosure, the target terminal may acquire the device information of the characteristic acquisition device in response to the triggering operation for establishing the association relationship between the characteristic acquisition device and the target client in the at least two clients, and then transmit the device information to the blockchain network so that the node devices included in the blockchain network authenticate the characteristic acquisition device according to the device information. A reference authentication result obtained after authentication, by each node device, on the characteristic acquisition device is acquired from the blockchain network, and whether the characteristic acquisition device passes authentication is determined according to the reference authentication results. Then after it is determined that the characteristic acquisition device passes authentication, the association relationship between the target client and the characteristic acquisition device can be established. By implementing the above method, one characteristic acquisition device is adopted to support operation of the different clients included in the terminal, thereby reducing configurations of the characteristic acquisition device and improving convenience.

BRIEF DESCRIPTION OF THE DRAWINGS

To describe the technical solutions in the embodiments of the disclosure more clearly, the following briefly introduces the accompanying drawings required for describing the embodiments. The accompanying drawings in the following description show only some embodiments of the disclosure, and a person of ordinary skill in the art may still derive other drawings from these accompanying drawings.

DESCRIPTION OF EMBODIMENTS

The following clearly describes the technical solutions in the embodiments of the disclosure with reference to the accompanying drawings in the embodiments of the disclosure. The described embodiments are some rather than all of the embodiments of the disclosure. All other embodiments obtained by a person of ordinary skill in the art based on the embodiments of the disclosure shall fall within the protection scope of the disclosure.

The embodiments of the disclosure provide a device management method based on a blockchain network. A target terminal may respond to a triggering operation for establishing an association relationship between a characteristic acquisition device and a target client in at least two clients, and node devices included in the blockchain network are made to perform device authentication on the characteristic acquisition device according to device information of the characteristic acquisition device, thereby establishing the association relationship between the target client and the characteristic acquisition device in response to determining that the characteristic acquisition device passes authentication. Accordingly, one characteristic acquisition device is adopted to support operation of the different clients included in the terminal, thereby reducing configurations of the characteristic acquisition device and improving convenience.

Figure 1A:
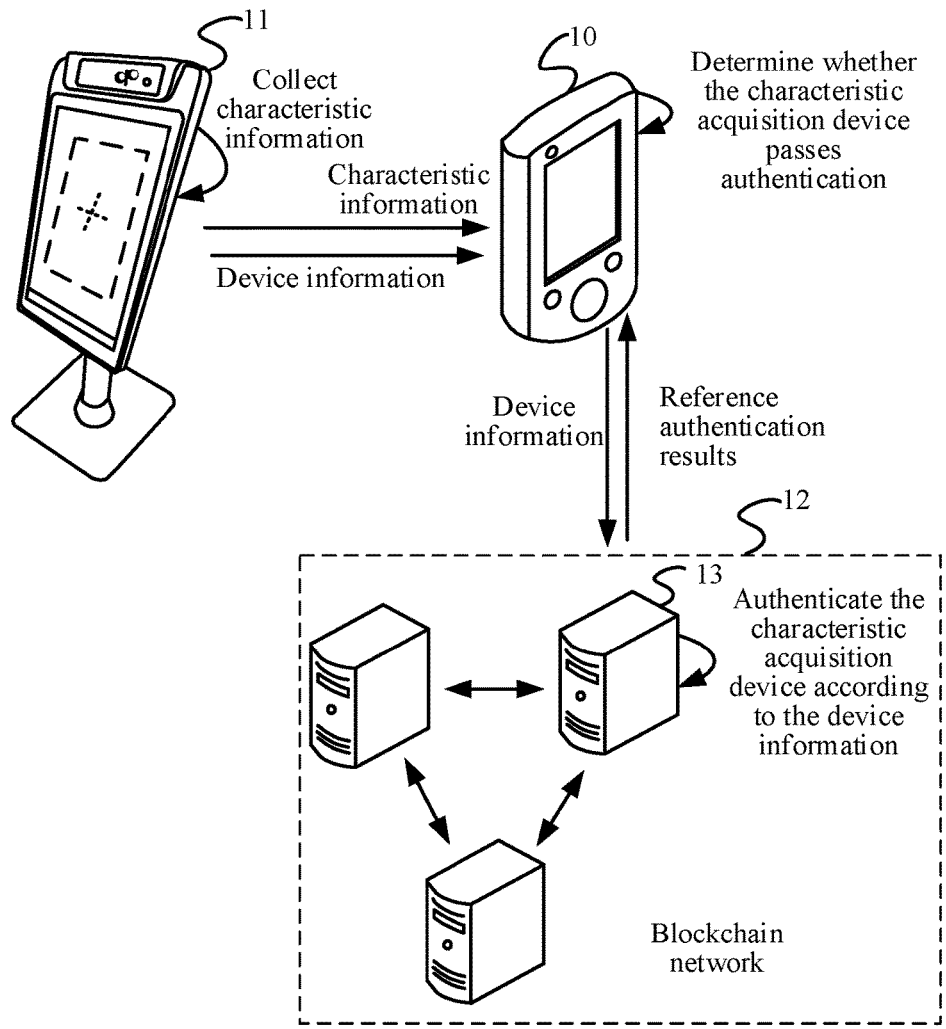
FIG. 1A is an architecture diagram of a device management system based on a blockchain network according to an embodiment of the disclosure.

Referring to FIG. 1A, FIG. 1A is an architecture diagram of a device management system based on a blockchain network according to an embodiment of the disclosure. The device management system based on a blockchain network includes a target terminal 10, a characteristic acquisition device 11 and a blockchain network 12, where the blockchain network 12 includes a plurality of node devices 13, and any node device in the blockchain network 12 may be configured to provide a business service for a corresponding client in the target terminal 10. In an embodiment, a target terminal 10 may support operation of a plurality of different clients, the clients may be payment clients, such as a payment client 1, a payment client 2 and a payment client 3, and the payment clients may be specifically WeChat payment customers or other clients for payments, which are not limited in this embodiment of the disclosure. The characteristic acquisition device 11 is configured to collect characteristic information, where the characteristic acquisition device 11 may be arranged in the target terminal 10 and may be independent of the target terminal 10, and in this embodiment of the disclosure, the characteristic acquisition device 11 being independent of the target terminal 10 is mainly taken as an example for detailed description. The characteristic information collected by the characteristic acquisition device 11 may be user facial images, fingerprint characteristics, vocal print characteristics, iris characteristics, or the like, and correspondingly, the characteristic acquisition device 11 may be an image acquisition device, a fingerprint acquisition device, a vocal print acquisition device, an iris acquisition device, or the like. In this embodiment of the disclosure, the characteristic acquisition device being the image acquisition device is mainly taken as an example for detailed description. Referring to this embodiment of the disclosure, when the characteristic acquisition device is another device, the image acquisition device may be, for example, a device marked by 11 in FIG. 1A.

In an embodiment, if the characteristic acquisition device 11 is the image acquisition device for collecting facial images, furthermore, the facial images collected by the characteristic acquisition device 11 may be adopted for identity authentication, specifically, the characteristic acquisition device 11 may perform face scanning on a user so that the characteristic acquisition device 11 acquires the facial images of the user, and after acquiring the facial images, the characteristic acquisition device 11 may transmit the facial images to a target terminal 10, and the target terminal 10 transmits the received facial images to any node device in a blockchain network 12. After receiving the facial images of the user, any node device may recognize the facial images so as to finish identity authentication on the user. In this embodiment of the disclosure, corresponding user operation, such as a payment operation or an unlocking operation, may be executed after the node device finishes identity authentication on the user. When the user selects one client in the target terminal 10 for a payment, establishing an association relationship between the client and the characteristic acquisition device 11 needs to be guaranteed. Then the association relationship between the client and the characteristic acquisition device 11 may be established in advance when it is guaranteed that the client in the target terminal 10 may be adopted by the user for performing an online commodity payment.

In an embodiment, a target terminal 10 may respond to a triggering operation for establishing an association relationship between a characteristic acquisition device 11 and a target client, and after the target terminal 10 responds to the triggering operation, the target terminal 10 may acquire device information of the characteristic acquisition device 11. The device information may carry signature information. Then after acquiring the device information carrying signature information, the target terminal 10 may transmit the device information carrying signature information to a blockchain network 12 so that node devices included in the blockchain network 12 authenticate the characteristic acquisition device 11 according to the device information. The target terminal 10 may acquire a reference authentication result obtained after authentication, by each node device, on the characteristic acquisition device 11 from the blockchain network, and determine whether the characteristic acquisition device 11 passes authentication according to the reference authentication results. Then after it is determined that the characteristic acquisition device 11 passes authentication, the association relationship between the characteristic acquisition device 11 and the target client can be established.

In an embodiment, when transmitting device information to a blockchain network 12, a target terminal 10 may transmit the device information to any node device in the blockchain network 12, and when the device information is sent to any node device, a device address of any node device may be acquired so as to judge whether the acquired device address is consistent to a preset device address. If yes, the any node device verifies the characteristic acquisition device according to the device information, and after authenticating the characteristic acquisition device, the any node device transmits the device information to the other node devices in the blockchain network, thereby enabling the other node devices to perform device authentication. If not, the device information may be sent to a target node device 13, indicated by the preset device address, in the blockchain network, the target node device 13 verifies the characteristic acquisition device according to the device information, and after authenticating the characteristic acquisition device, the target node device transmits the device information to the other node devices in the blockchain network, thereby enabling the other node devices to perform device authentication.

In an embodiment, when a target terminal 10 acquires a reference authentication result obtained after authentication, by each node device, on a characteristic acquisition device 11 from a blockchain network 12, the target terminal 10 may determine whether the characteristic acquisition device 11 passes authentication according to the reference authentication results. The reference authentication results may include: the characteristic acquisition device 11 passes authentication or the characteristic acquisition device 11 does not pass authentication. Then, the target terminal 10 may count a first number of reference authentication results for indicating that corresponding node devices determine that the characteristic acquisition device 11 passes authentication, determine a second number of normal node devices included in the blockchain network 12, and determine whether the characteristic acquisition device 11 passes authentication according to the first number and the second number. Specifically, if the first number is equal to the second number, it is determined that the characteristic acquisition device 11 passes authentication, and if the first number is less than the second number, it is determined that the characteristic acquisition device 11 does not pass authentication. In an embodiment, a second number may be determined according to verification feedback information acquired by a target terminal 10, where the verification feedback information is determined according to result information fed back after the other node devices in a blockchain network 12 authenticate a characteristic acquisition device according to device information after a target node device 13 transmits the device information to the other node devices in the blockchain network 12. For example, if the verification feedback information acquired by the target terminal 10 is 3, the second number is 3.

In conclusion, in an authentication process of the characteristic acquisition device, each node in the blockchain network may know the device information of the characteristic acquisition device, and whether the device passes authentication is jointly determined according to the authentication results of the plurality of node devices in the blockchain network rather than depend on a private protocol of a certain organization in a device authentication passing process, thereby guaranteeing data security and avoiding data failures due to data source tampering.

In an embodiment, when determining that a characteristic acquisition device 11 passes authentication, a target terminal 10 may store device information of the characteristic acquisition device into a blockchain network 12. The target terminal 10 may acquire a storage location of the device information in the blockchain network 12, obtain indexing information for inquiry of the device information of the characteristic acquisition device, and store the indexing information. In an embodiment, when a user performs related user operation such as a payment operation or an unlocking operation through a characteristic acquisition device 11, and the user selects a target client in a target terminal 10 to perform an online commodity payment or door control unlocking, whether the characteristic acquisition device 11 conforms to an assigned standard such as a national standard needs to be firstly verified, and a subsequent payment operation or unlocking operation may be performed by using the target client only does the characteristic acquisition device 11 conform to the assigned standard. Specifically, the target terminal 10 receives an inquiry operation request (inquiry request) for device information of the characteristic acquisition device 11, acquires indexing information of the device information, then, determines a storage location of the device information in a blockchain network 12 according to the indexing information of the device information, and acquires the device information from the storage location. Then, after acquiring the device information, the target terminal 10 may determine whether a device signature included in the inquiry operation request is matched with a device signature in the device information, and if yes, it can be verified and determined that the characteristic acquisition device 11 conforms to the assigned standard, thereby facilitating later user operation.

The number of nodes (one node device serves as a node) shown in FIG. 1A is only illustrative, and the number of nodes may be deployed at random according to practical needs.

There is a node identifier corresponding to each node in the blockchain network, each node in the blockchain network may store node identifiers of other nodes in the blockchain network, thereby broadcasting generated blocks to other nodes in the blockchain network later according to the node identifiers of other nodes. Each node may maintain a node identifier list as shown in Chart 1, and a node name and a node identifier are correspondingly stored in the node device identifier list. Each node identifier may be an Internet Protocol (IP) address or any other information for identifying the node, and in the table, only the IP addresses are taken as an example for description. For example, Table 1 is a node identifier list maintained by the node 1, and when the node 1 generates a new block, the new block can be broadcast to other nodes in the blockchain network according to the node identifiers of the nodes in Table 1.

TABLE 1

Node names and node identifiers corresponding to the node names

| Node name | Node identifier |
|---|---|
| Node 1 | 117.114.151.174 |
| Node 2 | 117.116.189.145 |
| ... | ... |
| Node N | 119.123.789.258 |

Figure 1B:
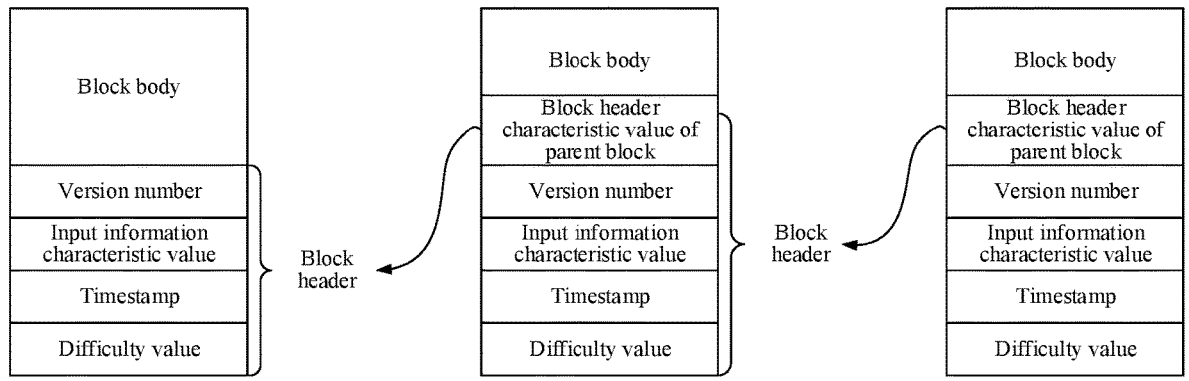
FIG. 1B is a schematic structural diagram of a blockchain according to an embodiment of the disclosure.

Each node in the blockchain network stores the same blockchain. The blockchain is composed of a plurality of blocks, referring to FIG. 1B, the blockchain is composed of the plurality of blocks, and a founding block includes a block header and a block body, where the block header stores an input information characteristic value, a version number, a timestamp and a difficulty value, and the block body stores input information. A next block of the founding block uses the founding block as a parent block, and also includes a block header and a block body. The block header stores an input information characteristic value of a current block, a block header characteristic value of the parent block, a version number, a timestamp, and a difficulty value. By analogy, block data stored in each block in the blockchain is associated with block data stored in the parent block, thereby ensuring the security of the input information in the blocks.

Figure 1C:
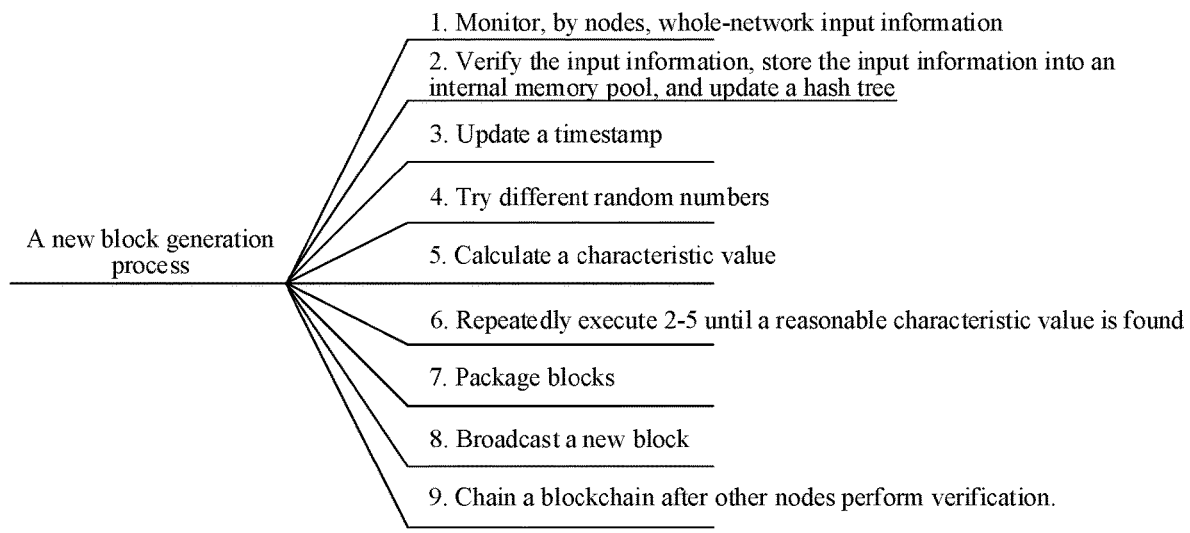
FIG. 1C is a schematic diagram of a process of generating a new block according to an embodiment of the disclosure.

When the blocks in the blockchain are generated, referring to FIG. 1C, when receiving input information, the node where the blockchain is located verifies the input information. After finishing verification, the node stores the input information in an internal memory pool, and updates a hash tree for recording the input information. Then, the timestamp is updated to the time when the input information is received, an attempt on different random numbers is made, characteristic value calculation is performed many times, and thus a calculated characteristic value may satisfy the following formula:

$$SHA256(SHA256(version+prev\_hash+merkle\_root+ntime+nbits+x))<TARGET$$

SHA256 is a characteristic value algorithm used for calculating the characteristic value; version is version information of related block protocols in the blockchain; prev_hash is a block header characteristic value of the parent block of the current block; merkle_root is a characteristic value of the input information; ntime is updating time for updating the timestamp; nbits is current difficulty being a constant value within a period of time and being determined again after a fixed time period is exceeded; x is a random number; and TARGET is a characteristic value threshold determined according to nbits.

Accordingly, when the random number satisfying the above formula is calculated, information can be correspondingly stored, the block header and the block body are generated, and the current block is obtained. Then, the node where the blockchain is located transmits the newly-generated block to other nodes in the blockchain network according to the node identifiers of other nodes in the blockchain network, and other nodes verify the newly-generated block and add the newly-generated block into the blockchains stored thereby after verification is finished.

Figure 2:
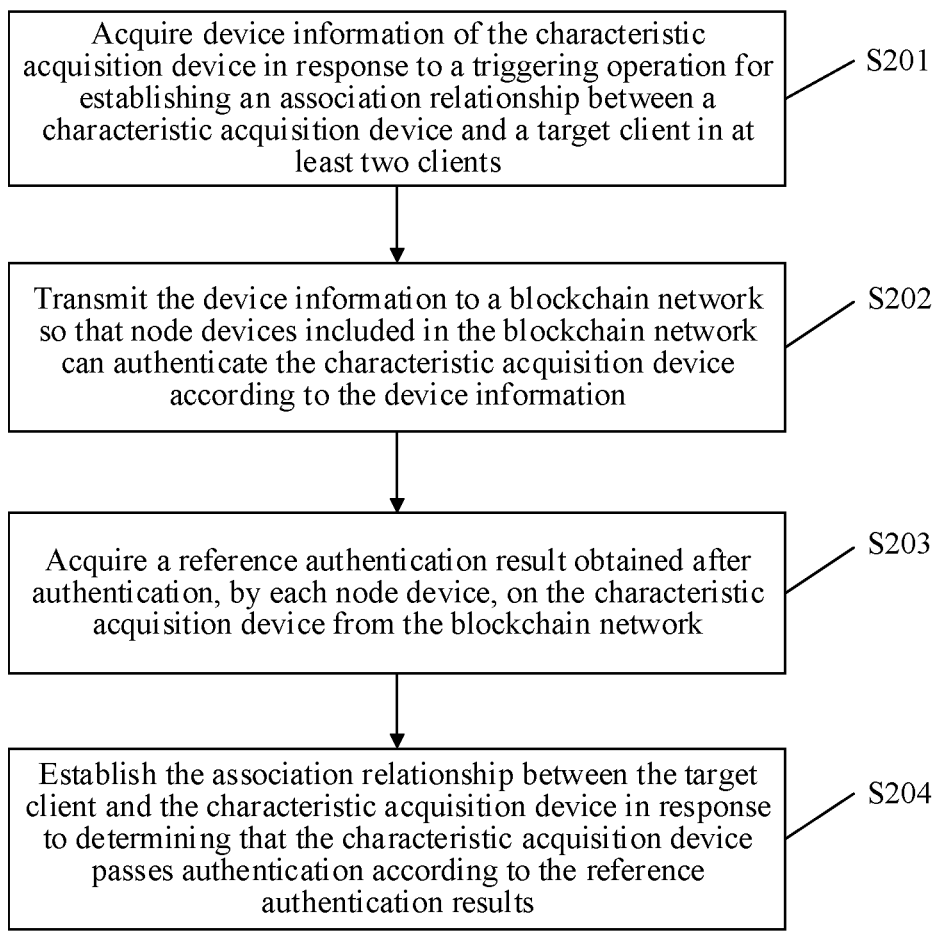
FIG. 2 is a schematic flowchart of a device management method based on a blockchain network according to an embodiment of the disclosure.

Referring to FIG. 2, FIG. 2 is a schematic flowchart of a device management method based on a blockchain network according to an embodiment of the disclosure. The device management method based on the blockchain network and described by the embodiment may be applied to the above target terminal, at least two clients run on the target terminal, the target terminal has a corresponding characteristic acquisition device, and as shown in FIG. 2, the method may include the following steps:

S201: Acquire device information of the characteristic acquisition device in response to a triggering operation for establishing an association relationship between the characteristic acquisition device and a target client in the at least two clients. For example, device information of a characteristic acquisition device that is associated with a target terminal is acquired in response to a triggering operation for establishing an association relationship between the characteristic acquisition device and a target client in the target terminal. The characteristic acquisition device is configured to collect characteristic information of a user, and the association relationship indicates a data communication connection between the characteristic acquisition device and the target terminal.

In an embodiment, when detecting that at least two clients are installed and run on a target terminal, the target terminal may determine that a triggering operation for establishing communication connection between a characteristic acquisition device and a target client is detected, and the target client may be any one of the at least two clients included in the target terminal. After detecting the triggering operation, the target terminal may acquire device information of the characteristic acquisition device and transmit the device information of the characteristic acquisition device to a blockchain network, and then step S202 is executed. The device information may include an identifier of a manufacturer for producing the characteristic acquisition device, delivery time, a release manufacturer, a device model, a device identifier, device parameters, a signature during releasing, etc., which are not limited by the disclosure.

In an embodiment, if a characteristic acquisition device is an image acquisition device for collecting facial images, and when a target terminal detects that at least two payment clients are installed and run on the target terminal, the target terminal may determine that a triggering operation for establishing communication connection between the image acquisition device and a target payment client is detected. A user may perform an online commodity payment through the payment client and the facial images, collected by the image acquisition device, of the user, and the target payment client may be any one of the payment clients included in the target terminal. After detecting the triggering operation, the target terminal may acquire device information of the characteristic acquisition device and transmit the device information of the characteristic acquisition device to a blockchain network.

In another embodiment, if a characteristic acquisition device is an image acquisition device for collecting facial images, and when a target terminal detects that at least two unlocking clients are installed and run on the target terminal, the target terminal may determine that a triggering operation for establishing communication connection between the image acquisition device and a target unlocking client is detected. A user may perform unlocking, such as door control unlocking, through the unlocking client and the facial images, collected by the image acquisition device, of the user, and the target unlocking client may be any one of the unlocking clients included in the target terminal. After detecting the triggering operation, the target terminal may acquire device information of the characteristic acquisition device and transmit the device information of the characteristic acquisition device to a blockchain network.

S202: Transmit the device information to the blockchain network so that node devices included in the blockchain network authenticate the characteristic acquisition device according to the device information. For example, the device information is transmitted to the blockchain network such that each of node devices in the blockchain network authenticates the characteristic acquisition device according to the device information.

In an embodiment, after acquiring the device information of the characteristic acquisition device, the target terminal may transmit the device information to the blockchain network. In a possible implementation, the target terminal may transmit the device information carrying signature information to the blockchain network so as to ensure security of the device information. The target terminal may acquire the device information and a device private key of the characteristic acquisition device from the characteristic acquisition device, performs, by the device private key, signing treatment on the device information so as to obtain the device information carrying the signature information, and then transmits the device information carrying the signature information to the blockchain network. Or, the target terminal may directly acquire the device information carrying the signature information from the characteristic acquisition device, and the device information carrying the signature information is obtained by signing treatment on the device information through the device private key of the characteristic acquisition device.

In an embodiment, a target terminal needs to transmit device information to a node device corresponding to a device address consistent to a device address preset by a target client when transmitting the device information to a blockchain network, the node device corresponding to the device address consistent to the device address preset by the target client in the blockchain network may be called a target node device, then, the device information is sent to the target node device so that a later target node can firstly authenticate a characteristic acquisition device according to the device information and then make other node devices in the blockchain network authenticate the characteristic acquisition device according to the device information. The target terminal may transmit the device information to any node device in the blockchain network, and thus when the target terminal transmits the device information to any node device in the blockchain network, a device address of any node device may be acquired so as to judge whether the acquired device address of any node device is consistent to the preset device address. If the acquired device address is consistent to the preset device address, any node device may verify the characteristic acquisition device according to the device information, and after authenticating the characteristic acquisition device, the any node device transmits the device information to other node devices in the blockchain network, so that other node devices authenticate the characteristic acquisition device according to the device information. If the acquired device address is not consistent to the preset device address, the device information may be sent to a target node device, indicated by the preset device address, in the blockchain network through a repositioning policy. Namely, the device information is sent to the node device, namely the target node device corresponding to the preset device address again according to the preset device address. After receiving the device information of the characteristic acquisition device, the target node device may verify the characteristic acquisition device according to the device information, and after authenticating the characteristic acquisition device, the target node device transmits the device information to other node devices in the blockchain network, so that other node devices authenticate the characteristic acquisition device according to the device information.

S203: Acquire a reference authentication result obtained after authentication, by each node device, on the characteristic acquisition device from the blockchain network. For example, a respective reference authentication result generated by each of the node devices is acquired, the respective reference authentication result indicating whether the characteristic acquisition device passes authentication of the respective node device.

In an embodiment, a reference authentication result obtained after authentication, by each node device, on a characteristic acquisition device may include that the characteristic acquisition device passes authentication, or the characteristic acquisition device does not pass authentication. In a possible implementation, a target terminal may acquire a reference authentication result obtained after authentication, by each node device, on a characteristic acquisition device from a blockchain network, and counts the number of target reference authentication results from the reference authentication results. The target reference authentication results include reference authentication results for indicating that the corresponding node devices determine that the characteristic acquisition device passes authentication, and the number of the target reference authentication results may be called a first number. After determining the first number of the target reference authentication results, the target terminal further needs to determine the number of normal node devices included in the blockchain network, and the number of the normal node devices may be called a second number. Then, after determining the first number and the second number, the target terminal may determine whether the characteristic acquisition device passes authentication according to the first number and the second number.

S204: Establish an association relationship between the target client and the characteristic acquisition device in response to determining that the characteristic acquisition device passes authentication according to the reference authentication results. For example, the association relationship between the target client and the characteristic acquisition device is established in response to the characteristic acquisition device passing the authentication according to the reference authentication results.

In an embodiment, a target terminal may establish an association relationship between a target client and a characteristic acquisition device when determining that the characteristic acquisition device passes authentication. Then, after the association relationship is established between each of at least two clients on the target terminal and the characteristic acquisition device, the target terminal may acquire characteristic information from the characteristic acquisition device and transmit the characteristic information to any node device in a blockchain network so that any node device recognizes the characteristic information, thereby finishing identity authentication on a user. Corresponding user operation is executed after any node device finishes identity authentication on the user.

For example, assuming that the characteristic acquisition device is an image acquisition device for collecting facial images, and the target client included in the target terminal is a payment client, a user may perform an online commodity payment through the characteristic acquisition device after the association relationship between the target client and the characteristic acquisition device is established. For example, the image acquisition device may perform face scanning on the user so as to acquire the facial images of the user. After acquiring the facial images of the user, the image acquisition device may transmit the facial images of the user to the target terminal, and the target terminal transmits the received facial images to any node device in the blockchain network. After receiving the facial images, any node device may recognize the facial images so as to finish identity authentication on the user. After identity authentication passes, the online commodity payment may be achieved according to the corresponding client, considering that the target terminal at least has two payment clients, in other words, the other payment clients exist besides the target client, namely, the user can have at least two payment modes for payments, and thus, when the user performs the payment, the user may preselect the to-be-adopted payment mode or preselect the payment client for the payment.

In an embodiment, when determining that a characteristic acquisition device passes authentication, device information of the characteristic acquisition device may be stored in a blockchain network. Data of each node device in the blockchain network is stored with Block as a unit. In addition, the data stored on each normal node device is consistent. If there are many pieces of device information (or many sub device information), the device information is stored in different blocks (e.g., each sub device information is stored in a respective block). For example, if there are 5 pieces of device information, first device information in the device information may be stored in a first block, second device information in the device information may be stored in a second block, and by analogy, fifth device information in the device information may be stored in a fifth block. A specific implementation for storage of each piece of device information may be described as below, and storing third device information in the device information in a third block is exemplarily described below.

In an embodiment, in response to determining that a characteristic acquisition device passes authentication, a target node device may store acquired device information into a block body, calculate a merkle root of the device information, acquire a hash value of a last block of a current blockchain, and store the merkle root of the device information, the hash value of the last block of the current blockchain and a current timestamp into a block header. The target node device combines the block header and the block body storing the device information as a third block, adds the third block to a blockchain stored by the target node device, and broadcasts the first block to other node devices in a blockchain network, thereby enabling other node devices to add the first block to respectively-maintained blockchains and making the blockchains maintained by the node devices in the blockchain network synchronized.

In conclusion, on the basis of the integrity property and the tamper-proof property of the blockchains, it can be guaranteed that the device information, acquired by the target node device, of the characteristic acquisition device is credible and is not tampered, it can also be guaranteed that the device information, later stored on the blockchains, of the characteristic acquisition device cannot be tampered, thereby improving device management safety and credibility.

Figure 3:
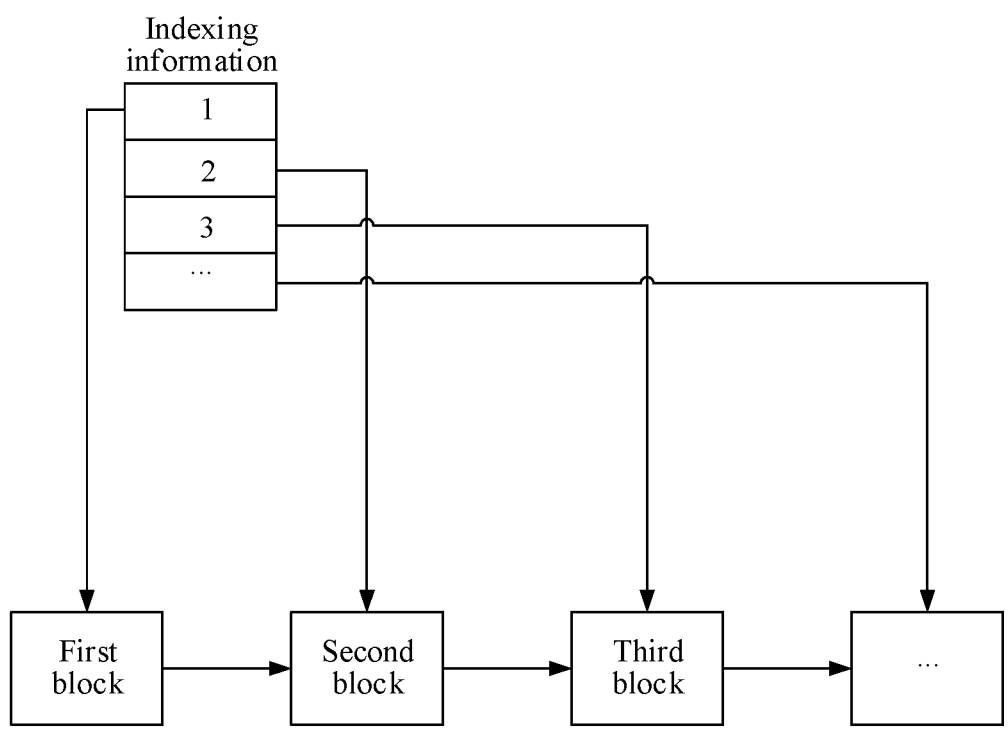
FIG. 3 is a schematic diagram of a relationship between blocks and indexing information according to an embodiment of the disclosure.

In an embodiment, after each piece of device information is stored in a respectively-maintained blockchain of each node device in a blockchain network, a target terminal may acquire a storage location of each piece of device information in the blockchain network, sequentially store each storage location so as to obtain indexing information for later inquiry (i.e., to later find) of the device information of a characteristic acquisition device, and store the indexing information. The indexing information may be digit numbers, bit values (bits), or other information, which is not limited by the disclosure. For example, as shown in FIG. 3, if there are 3 pieces of device information, after being stored in the blockchain network, the 3 pieces of device information is stored in a first block, a second block and a third block correspondingly. The target terminal may acquire 3 storage locations corresponding to the 3 pieces of device information and sequentially store the 3 storage locations so as to obtain indexing information for inquiry of the device information of the characteristic acquisition device and store the indexing information. As shown in FIG. 3, the indexing information, stored in the first block, for the device information is 1, the indexing information, stored in the second block, for the device information is 2, and the indexing information, stored in the third block, for the device information is 3. Specifically, the target terminal may store a corresponding relationship between the storage locations of the device information and the indexing information, for example, Table 2 shows a corresponding relationship between storage locations of device information and indexing information stored by the target terminal. It can be seen from Table 2 that if the device information is stored in the first block, the indexing information corresponding to the device information is "1" so that the indexing information namely "1" for inquiry of the device information may be acquired when the target terminal is about to inquire the device information, and after the indexing information for inquiry of the device information is acquired, the target terminal may determine that the device information is stored in the first block on the blockchain network according to the indexing information:

TABLE 2

A relationship between storage locations of device information and indexing information stored by the target terminal

| Storage location | Indexing information |
|---|---|
| First block | 1 |
| Second block | 2 |
| Third block | 3 |
| ... | ... |

In an embodiment, a target terminal may receive an inquiry operation request for device information and acquire indexing information for the device information according to the device information related to the inquiry operation request. After receiving the indexing information for the device information, the target terminal may determine a storage location of the device information in a blockchain network according to the indexing information for the device information. Then, whether a device signature included in the inquiry operation request is matched with a device signature in the device information is determined. If yes, device information of a characteristic acquisition device is acquired from the blockchain network according to the indexing information for the device information.

After the target terminal establishes an association relationship between a target client and the characteristic acquisition device, the target client may run on the target terminal. If the target client is started on the target terminal, whether the characteristic acquisition device conforms to an assigned standard needs to be firstly verified, for example, the assigned standard may be a national standard, and a subsequent user operation can be performed only after it is determined that the characteristic acquisition device conforms to the assigned standard. For example, assuming that the characteristic acquisition device is an image acquisition device for collecting facial images and the target client is a payment client. When a user performs an online commodity payment by using the target client, whether the image acquisition device conforms to the national standard needs to be firstly verified, and the target client may perform the payment operation of the user only when the image acquisition device conforms to the national standard.

In an embodiment, a specific execution mode for verifying whether a characteristic acquisition device conforms to an assigned standard may include: a target terminal may transmit an inquiry operation request for device information of the characteristic acquisition device to a blockchain network, acquire inquiry indexes of the device information and then determine a storage location of the device information of the characteristic acquisition device on the blockchain network according to the inquiry indexes. The inquiry operation request is used for verifying whether the characteristic acquisition device conforms to the assigned standard, and if it is determined that the characteristic acquisition device conforms to the assigned standard, later user operation can be performed. The inquiry operation request carries a production signature of the characteristic acquisition device, the production signature may be a signature during characteristic acquisition device releasing, and the target terminal may add a signature of the target client on the production signature of the characteristic acquisition device. The target terminal may transmit the inquiry operation request to any node device in the blockchain network, namely, may transmit the inquiry operation request to a target node device, and may also transmit the inquiry operation request to other node devices. If the target terminal transmits the inquiry operation request to the target node device, the target node device may receive the inquiry operation request, and after the inquiry operation request is acquired, indexing information of the device information is acquired according to the device information related to the inquiry operation request. After receiving the indexing information for the device information, the target terminal may determine the storage location of the device information in the blockchain network according to the indexing information for the device information, and then acquires the device information from the storage location. Then, after acquiring the device information, the target terminal may determine whether a device signature included in the inquiry operation request is matched with a device signature in the device information according to matching of the device signature included in the inquiry operation request and the device signature in the device information. If the device signature included in the inquiry operation request is matched with the device signature in the device information, it is proved that the characteristic acquisition device conforms to the assigned standard, and then later usage operation can be performed. If the device signature included in the inquiry operation request is not matched with the device signature in the device information, it is proved that the characteristic acquisition device does not conform to the assigned standard, and then later usage operation cannot be performed.

In conclusion, one characteristic acquisition device may support operation of different clients included in the terminal. If the user uses the client and the characteristic acquisition device to achieve certain user operation, the client needs to verify whether the characteristic acquisition device conforms to the assigned standard. In this embodiment of the disclosure, the target terminal may store the device information of the characteristic acquisition device into the blockchain network in a federated blockchain mode, and a federated blockchain may allow the client or the terminal including the client to inquire about validity of the characteristic acquisition device or modification processes of the characteristic acquisition device as long as the client joins the federated blockchain, thereby ensuring validity of the characteristic acquisition device.

In an embodiment, after receiving an inquiry operation request sent by a target terminal and acquiring device information, a target node device may transmit an information verifying request to other node devices so as to verify whether the acquired device information is complete, and the information verifying request may include the device information acquired at the target node device. After receiving the information verifying request, other node devices may acquire the device information on respectively-maintained blockchains to be matched with the device information included in the information verifying request. If the device information acquired from other node devices is matched with the device information included in the information verifying request, it is verified that the device information acquired from the target node device is complete.

For example, assuming that the target terminal sends the information verifying request to a node device A on a blockchain network, after acquiring device information from a blockchain maintained by the node device A, the node device A may transmit the information verifying request including the device information to a node device B, a node device C, a node device D and a node device E on the blockchain network. After receiving the information verifying request, the node device B, the node device C, the node device D and the node device E may acquire device information on respectively-maintained blockchains so as to be matched with the device information included in the information verifying request. If matching results are consistent, a message indicating that the device information is complete may return to the node device A so as to inform the node device A about the complete acquired device information. After integrity of the device information is determined, the node device A match a device signature in the device information with a device signature in the device information included in the information verifying request so as to verify whether the characteristic acquisition device conforms to the national standard.

In this embodiment of the disclosure, the target terminal may acquire the device information of the characteristic acquisition device in response to a triggering operation for establishing an association relationship between the characteristic acquisition device and a target client in at least two clients, and then transmit the device information to the blockchain network so as to make the node devices included in the blockchain network authenticate the characteristic acquisition device according to the device information. The target terminal acquires reference authentication results obtained after authentication, by the node devices, on the characteristic acquisition device from the blockchain network, and determines whether the characteristic acquisition device passes authentication according to the reference authentication results. Therefore, the association relationship between the target client and the characteristic acquisition device can be established in response to determining that the characteristic acquisition device passes authentication, and accordingly, one characteristic acquisition device is adopted for supporting operation of the different clients in the terminal, thereby reducing configurations of the characteristic acquisition device and improving convenience.

Figure 4:
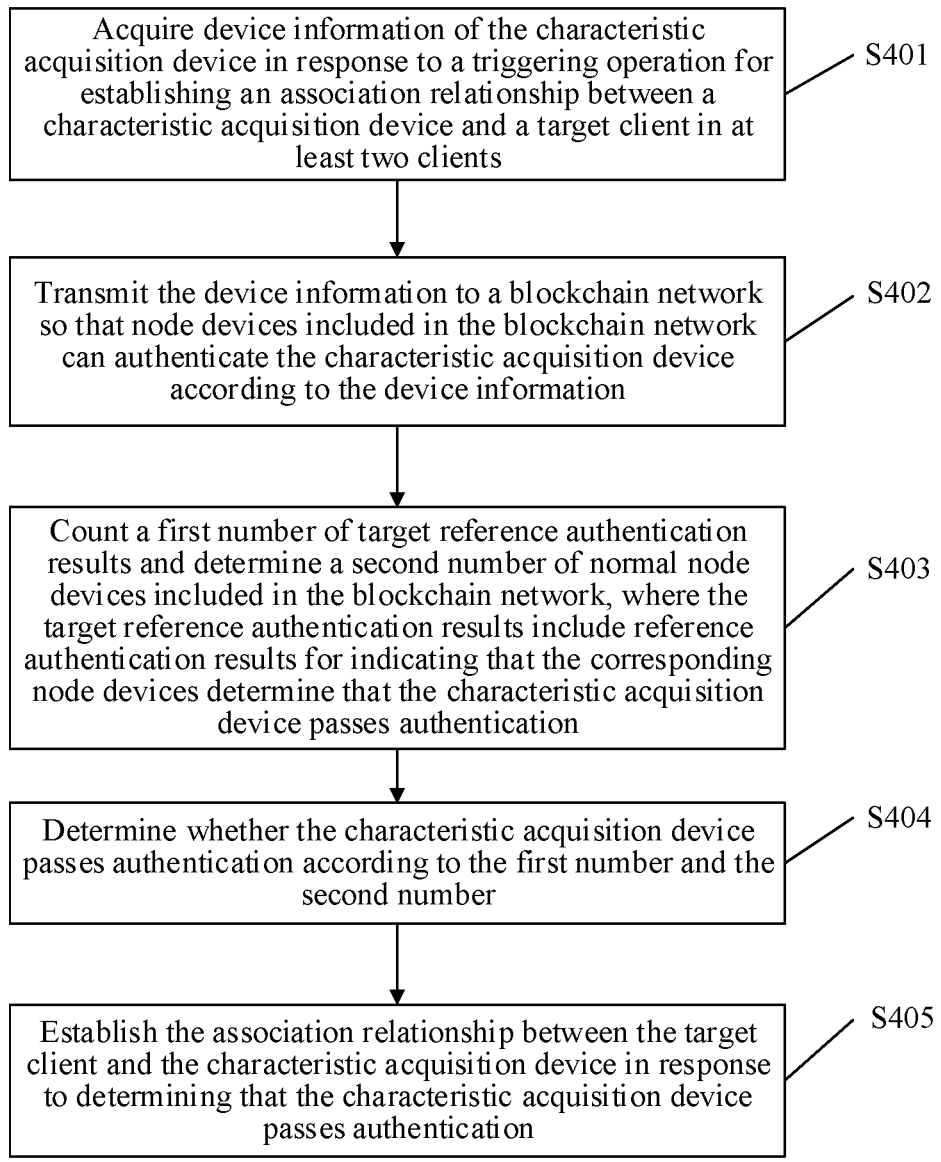
FIG. 4 is a schematic flowchart of another device management method based on a blockchain network according to an embodiment of the disclosure.

Referring to FIG. 4, FIG. 4 is a schematic flowchart of a device management method based on a blockchain network according to an embodiment of the disclosure. The device management method based on the blockchain network and described by the embodiment may be applied to the above target terminal, at least two clients run on the target terminal, the target terminal includes a characteristic acquisition device, and as shown in FIG. 4, the method may include the following steps:

S401: Acquire device information of the characteristic acquisition device in response to a triggering operation for establishing an association relationship between the characteristic acquisition device and a target client in the at least two clients.

S402: Transmit the device information to the blockchain network so that node devices included in the blockchain network authenticate the characteristic acquisition device according to the device information.

Refer to detailed descriptions of S201 and S202 in the above embodiment for specific execution modes of S401 and S402, which are not repeated herein.

S403: Count a first number of target reference authentication results and determine a second number of normal node devices included in the blockchain network, where the target reference authentication results include reference authentication results for indicating that the corresponding node devices determine that the characteristic acquisition device passes authentication.

In an embodiment, a target terminal may count a first number of target reference authentication results, where the target reference authentication results include reference authentication results for indicating that corresponding node devices determine that a characteristic acquisition device passes authentication. Then, the target terminal needs to determine a second number of normal node devices included in a blockchain network when counting the first number of the target reference authentication results so that the target terminal can determine whether the characteristic acquisition device passes authentication according to the first number and the second number.

In an embodiment, according to a specific implementation for acquiring a first number, node devices included in a blockchain network transmit reference authentication results for indicating that the corresponding node devices determine that a characteristic acquisition device passes authentication or for indicating that the corresponding node devices determine that the characteristic acquisition device passes authentication to a target terminal after authenticating the characteristic acquisition device according to device information. Then the target terminal may determine the first number according to the acquired reference authentication results. The target terminal may count the number, namely the first number, of the acquired target reference authentication results.

In an embodiment, according to a specific implementation of a second number, a target terminal acquires verification feedback information from a target node device, where the verification feedback information is determined according to result information fed back after other node devices in a blockchain network authenticate a characteristic acquisition device according to device information after the target node device transmits the device information to other node devices in the blockchain network. The target terminal may determine a second number of normal node devices included in the blockchain network according to the acquired verification feedback information after acquiring the verification feedback information from the target node device. The target node device may verify the characteristic acquisition device according to the device information after receiving the device information of the characteristic acquisition device. The device information carries the signature information. The device information carrying the signature information is obtained by acquiring, via the target terminal, the device information and a device private key of the characteristic acquisition device from the characteristic acquisition device, and performing, by the device private key, signing treatment on the device information. Then, the target node device verifies the characteristic acquisition device according to the device information and namely verifies whether the signature information in the device information carrying the signature information is valid. If the signature information is valid, the target node device may transmit the device information carrying the signature information to other node devices in the blockchain network so that other node devices authenticate the characteristic acquisition device according to the device information carrying the signature information. Other node devices may verify whether the signature information in the device information is valid after receiving the device information carrying the signature information. Other node devices may feed back result information obtained after authentication, by other node devices, on the characteristic acquisition device to the target terminal after authenticating the characteristic acquisition device according to the device information.

The result information may indicate that the characteristic acquisition device passes authentication or does not pass authentication. After the target node device receives the result information fed back by other node devices, the target terminal may acquire the verification feedback information from the target node device. The verification feedback information refers to result information that the corresponding node devices determine that the characteristic acquisition device passes authentication. Then, the target terminal may determine the second number of the normal node devices included in the blockchain network according to the number of the verification feedback information acquired from the target node device. Namely, after acquiring all the verification feedback information from the target node device, the target terminal may count the number of the verification feedback information. The counted number of the verification feedback information is the second number of the normal node devices included in the blockchain network. Or, the target terminal acquires one piece of verification feedback information from the target node device. Then, it is determined that the number of the normal node device included in the blockchain network is 1. Accordingly, after the target terminal acquires one piece of verification feedback information from the target node device again, 1 is added to the original number being 1 of the normal node device, by analogy, the second number of the normal node devices can be determined. For example, if last verification feedback information acquired by the target terminal from the target node device is 5th verification feedback information, it can be determined that the second number of the normal node devices is 5.

S404: Determine whether the characteristic acquisition device passes authentication according to the first number and the second number.

S405: Establish the association relationship between the target client and the characteristic acquisition device in response to determining that the characteristic acquisition device passes authentication.

In S404 and S405, the target terminal can determine whether the characteristic acquisition device passes authentication according to the first number and the second number after determining the first number of the target reference authentication results and the second number of the normal node devices included in the blockchain network. For example, the target terminal may determine whether the characteristic acquisition device passes authentication according to the relationship between the first number and the second number by comparing the first number with the second number. The target terminal determines that the characteristic acquisition device passes authentication if the first number is equal to the second number through comparison between the first number and the second number; and the target terminal determines that the characteristic acquisition device does not pass authentication if the first number is less than the second number through comparison between the first number and the second number. The association relationship between the target client and the characteristic acquisition device can be established only when the target terminal determines that the characteristic acquisition device passes authentication.

In a specific application scenario, assuming that the characteristic acquisition device is an image acquisition device for collecting facial images of a user and the target terminal includes one executable payment client 1, the image acquisition device corresponds to the payment client 1 in the target terminal, namely, an association relationship is established between the image acquisition device and the payment client 1, and thus the user can perform an online commodity payment through the payment client 1 and the facial images, collected by the image acquisition device, of the user. If the target terminal is further provided with a payment client 2 and needs to operate the payment client 2 and the user may perform the online commodity payment through the payment client 2 and the facial images, collected by the image acquisition device, of the user, an association relationship also needs to be established between the image acquisition device and the payment client 2. If the target terminal is further provided with a plurality of payment clients later, similarly, the online commodity payment can be achieved only after an association relationship is established between the plurality of payment clients and the image acquisition device. In conclusion, the target terminal may support payment modes corresponding to the at least two payment clients so that a facial recognition device (image acquisition device) of a commercial tenant may support a plurality of payment agencies without purchasing a plurality of facial recognition devices, thereby reducing configurations of the facial recognition devices, effectively reducing costs of the commercial tenant and meanwhile improving payment convenience.

In an embodiment, in order to guarantee that a target terminal may achieve payment modes corresponding to a plurality of payment clients through an image acquisition device, a device manufacturer corresponding to the image acquisition device may store device information of the image acquisition device in a blockchain network after the image acquisition device is delivered out of a factory and is authenticated, where any node device in the blockchain network provides a business service for any payment client in the target terminal. It is to be understood that before the device information of the image acquisition device is stored in the blockchain network, a payment client achieving an online commodity payment through the image acquisition device in the target terminal may join in the blockchain network, and then the device information of the image acquisition device can be later stored in the blockchain network only after the payment client successfully joins the blockchain network.

Figure 5A:
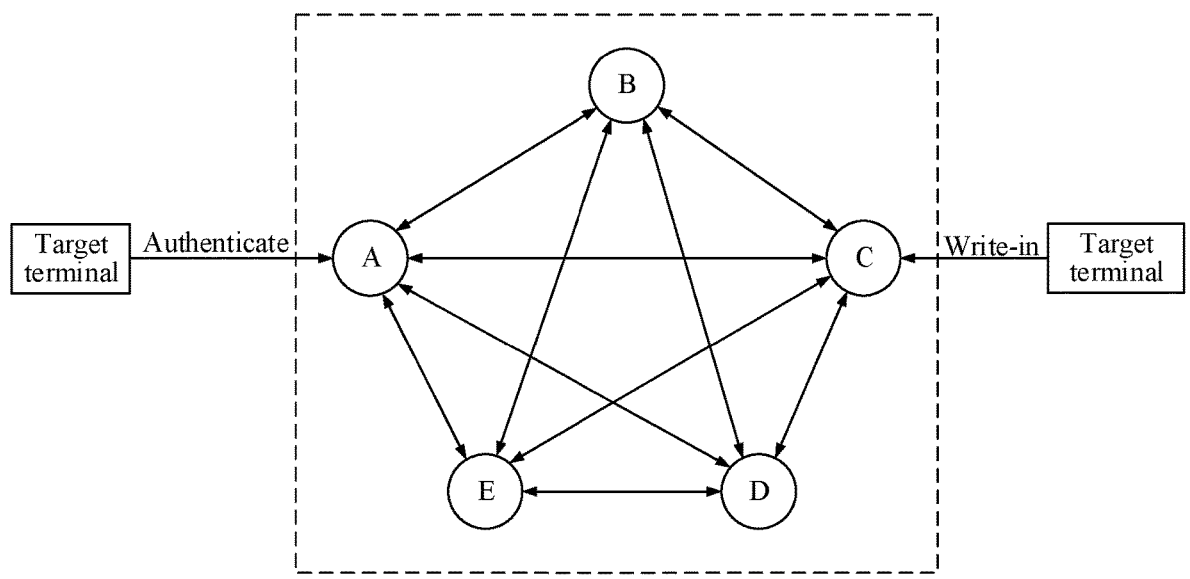
FIG. 5A is a schematic flowchart of still another device management method based on a blockchain network according to an embodiment of the disclosure.

In an embodiment, a blockchain network including 5 node devices shown in FIG. 5A is exemplarily described: when payment clients in a target terminal join in a blockchain network, a public key corresponding to each payment client is added in each node device, and the public keys may make node devices to later decrypt device information carrying signature information and verify validity of the signature information. When a new payment client is added to the target terminal and the new payment client can run, the new payment client can firstly join in the blockchain network, while the new payment client needs to get consensus authentication from other node devices in the blockchain network before successfully joining the blockchain network. After the consensus authentication passes, namely, after other payment clients corresponding to other node devices in the blockchain network agree, the new payment client can join in the blockchain network, a public key corresponding to the new payment client can join in a node device corresponding to the new payment client, and the public key can be broadcast to other node devices in the blockchain network so that the public key of all the node devices in the blockchain network is consistent. After the new payment client successfully joins the blockchain network, the device information of the image acquisition device for achieving the payment cooperation can be stored in the blockchain network so that the user can perform the payment operation later by using the new payment client.

Figure 5B:
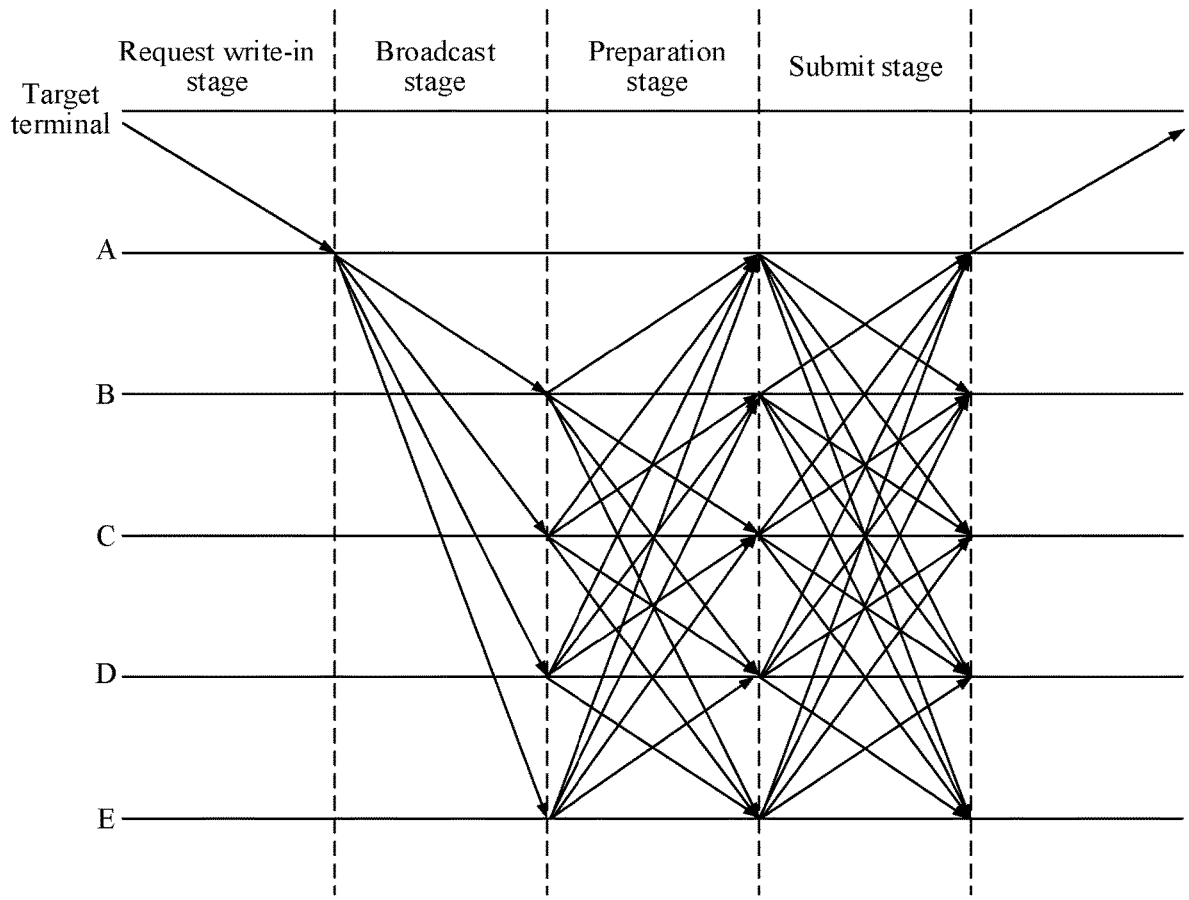
FIG. 5B is a schematic flowchart of storing device information of an image acquisition device into a blockchain network according to an embodiment of the disclosure.

In an embodiment, a specific implementation process for storing device information of an image acquisition device in a blockchain network may include: when detecting that a target payment client (understood as the above new payment client) is installed and runs in a target terminal, the target terminal determines that triggering operation for establishing communication connection between the target payment client and the image acquisition device is detected, and when an association relationship between the target payment client and the image acquisition device is established, the device information of the image acquisition device may be stored in the blockchain network. Specifically, when the triggering operation for establishing communication connection between the target payment client and the image acquisition device is detected, the device information of the image acquisition device can be sent to the blockchain network so that node devices included in the blockchain network can authenticate the image acquisition device according to the device information. In response to determining that the image acquisition device passes authentication, the association relationship between the target payment client and the image acquisition device is established, and the device information of the image acquisition device is stored in the blockchain network. FIG. 5B is a schematic flowchart of storing device information of an image acquisition device into a blockchain network according to an embodiment of the disclosure. In a process shown in FIG. 5B, an implementation process for storing the device information of the image acquisition device into the blockchain network may include four stages, namely a request write-in stage, a broadcast stage, a preparation stage and a submit stage.

The specific implementation process for storing (or understood as write-in) the device information of the image acquisition device into the blockchain network may include s11-s16:

s11: Verify whether signature information in the device information carrying the signature information is valid after a target node device receives the device information of the image acquisition device, and broadcast the device information carrying the signature information to other node devices if the signature information is valid.

In an embodiment, a target terminal may acquire device information of an image acquisition device when detecting triggering operation for establishing communication connection between a target payment client and the image acquisition device, where the device information may include an identifier of a manufacturer for producing the image acquisition device, a device identifier of the image acquisition device, related device parameters of the image acquisition device, delivery time of the image acquisition device, etc. The target terminal may transmit the device information to the blockchain network after acquiring the device information, where the target terminal may transmit the device information to any node device in the blockchain network, and as shown in FIG. 5B, the target terminal transmits the device information to a node device A.

After the device information is sent to the node device A, whether the node device corresponds to the target payment client needs to be determined, and node devices on the blockchain network correspond to payment clients included in the target terminal. For example, a payment client 1 included in the target terminal corresponds to the node device A, and a payment client 2 corresponds to a node device B. Then, after the device information is sent to the node device, besides acquiring a device address of the node device and determining a target node device by judging whether the acquired device address and a preset device address are consistent, any node device may determine whether the any node device is the target payment client when the target terminal transmits the device information to the any node device. If yes, later device authentication operation can be performed. If not, a device address of the target node device corresponding to the target payment client may return to the target terminal, and the device address may be an Internet Protocol (IP) address in the above described node identifier. Then, after receiving the device address of the target node device, the target terminal may perform redirection according to the device address and transmit the device information to a node device, namely the target node device corresponding to the device address.

If the node device A is the target node device, the node device A may verify the image acquisition device according to the device information after receiving the device information. The device information carries signature information so that the target node device can perform device verification according to validity of the signature information. If the signature information is valid, it is determined that the image acquisition device passes authentication, and if the signature information is invalid, it is determined that the image acquisition device does not pass authentication. After the target node device determines that the image acquisition device passes authentication, the broadcast stage can be started, the device information carrying the signature information is sent to other node devices namely a node device B, a node device C, a node device D and a node device E in the blockchain network. Other node devices may verify the image acquisition device according to the device information after receiving the device information carrying the signature information.

s12: Verify, by the node device B, the node device C, the node device D and the node device E, whether the signature information in the device information carrying the signature information is valid after receiving the device information carrying the signature information.

In an embodiment, a node device B, a node device C, a node device D and a node device E may verify whether signature information carried by device information is valid. When there are many pieces of received device information, verifying validity of the signature information further includes verifying a device information sequence and verifying whether a device information operation sequence is correct. If correct, it is determined that the signature information is valid, and if incorrect, it is determined that the signature information is incorrect.

s13: Store, by each node device, result information obtained after respective verification and feed the respective result information to other node devices after verification by the node device B, the node device C, the node device D and the node device E is finished.

In an embodiment, the result information may include determining corresponding node devices as normal node devices or determining corresponding node devices as abnormal node devices. Specifically, a manner for determining the corresponding node devices as the normal node devices or the abnormal node devices is judged according to validity of signature information verified by the node devices. For example, if the signature information verified by a node device B is valid, it is determined that the node device B is normal, and if the signature information verified by the node device B is invalid, it is determined that the node device B is abnormal.

s14: Count, by nodes, the number of the normal node devices.

In an embodiment, as shown in FIG. 5B, after verifying respective abnormality, the node device B, the node device C, the node device D and the node device E may transmit result information related to node device abnormality to node devices in a blockchain network, and the node devices may count the number of normal node devices and the above second number. When the second number exceeds a threshold which may be 2f+1, the number of the normal node devices exceeds 2f+1, and then a later submit stage may be performed. f represents the number of abnormal node devices. Then, it is to be understood that 3f+1=n, where n is the number of the node devices in the blockchain network, f represents the number of the abnormal node devices, and 2f+1 represents the number of normal node devices. For example, assuming that there are totally 5 node devices, the number of the normal node devices exceeds 3, namely, there is 1 abnormal node device at most, later steps may be performed.

s15: Feed, by the node devices, respective reference authentication results back to other node devices, and count, by the node devices, the number of target reference authentication results.

In an embodiment, as shown in FIG. 5B, after node devices in a blockchain network count the number of normal node devices, the node devices in the blockchain network may transmit reference authentication results obtained after authentication, by the corresponding node devices, on an image acquisition device to other node devices, and the reference authentication results may include: the corresponding node devices determine that the image acquisition device passes authentication or does not pass authentication. Specifically, when the number, counted by a certain node device, of the normal node devices does not exceed the threshold, the node device transmits a reference authentication result about determining that the image acquisition device does not pass authentication to other node devices. When the number, counted by a certain node device, of the normal node devices exceeds the threshold, the node device transmits a reference authentication result about determining that the image acquisition device passes authentication to other node devices. After receiving the reference authentication results, the node devices may count the number, namely, the above first number of the reference authentication results about determining that the image acquisition device passes authentication. If the first number also exceeds 2f+1, or the first number is equal to the above second number, it can be determined that the image acquisition device passes authentication. Then device information of the image acquisition device can be stored in the blockchain network.

s16: Receive, by the target terminal, the number of the target reference authentication results returned by the nodes.

In an embodiment, node devices may transmit respective reference authentication results to a target terminal, and the target terminal may determine whether an image acquisition device passes authentication according to the reference authentication results. Then, after it is determined that the image acquisition device passes authentication, an association relationship between a target payment client and the image acquisition device can be established, and device information of the image acquisition device can also be stored in a blockchain network.

Write-in of the device information of the image acquisition device is not a high-frequency operation. The device information of the image acquisition device needs to be written into the blockchain network only after finishing production and detection on a factory line corresponding to the image acquisition device. Accordingly, failures of a certain node device in the blockchain network may only have an influence on establishing an association relationship between a payment client corresponding to the node device and the image acquisition device but not influence establishing association relationships between other payment clients and the image acquisition device due to the fact that one node device with failures does not influence usage of other node devices.

In this embodiment of the disclosure, the target terminal may acquire the device information of the image acquisition device in response to a triggering operation for establishing an association relationship between the image acquisition device and the target payment client in the at least two payment clients and then transmit the device information to the blockchain network so as to make the node devices included in the blockchain network authenticate the image acquisition device according to the device information. Then, a first number of the reference authentication results for indicating that the corresponding node devices determine that the image acquisition device passes authentication can be counted, a second number of normal node devices included in the blockchain network can be determined, and whether the image acquisition device passes authentication is determined according to the first number and the second number. In response to determining that the image acquisition device passes authentication, the association relationship between the target payment client and the image acquisition device can be established, and one image acquisition device is adopted to support operation of the different clients included in the terminal, thereby reducing configurations of the image acquisition device and improving convenience.

Figure 6:
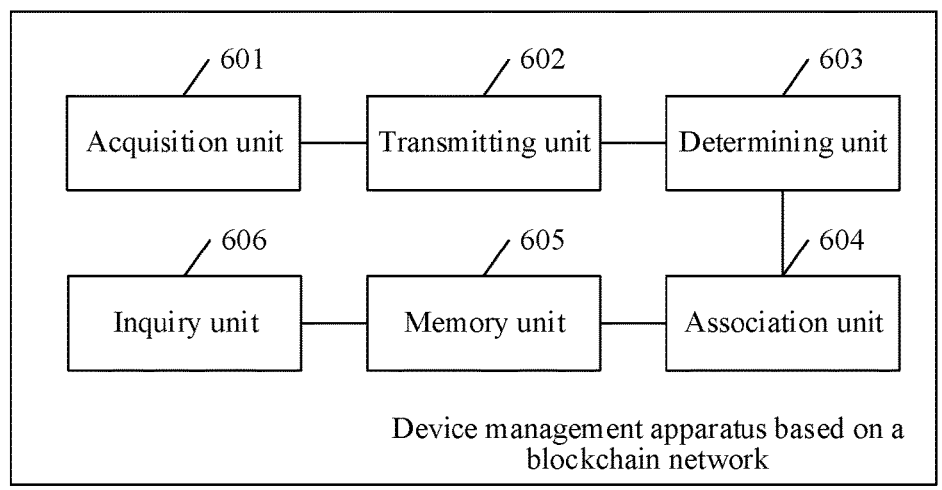
FIG. 6 is a schematic block diagram of a device management apparatus based on a blockchain network according to an embodiment of the disclosure.

Based on the above description of the embodiments of the device management method, this embodiment of the disclosure further provides a device management apparatus based on a blockchain network. The device management apparatus may run on the above target terminal or is a computer program (including a program code) in the target terminal, at least two clients run on the target terminal, and the target terminal has corresponding characteristic acquisition devices. The device management apparatus may be configured to execute the device management method based on the blockchain network shown in FIG. 2 and FIG. 4, and referring to FIG. 6, the device management apparatus based on the blockchain network includes: an acquisition unit 601, a transmitting unit 602, a determining unit 603 and an association unit 604.

The acquisition unit 601 is configured to acquire device information of the characteristic acquisition device in response to a triggering operation for establishing an association relationship between a characteristic acquisition device and a target client in at least two clients.

The transmitting unit 602 is configured to transmit the device information to the blockchain network so that node devices included in the blockchain network authenticate the characteristic acquisition device according to the device information.

A determining unit 603 configured to acquire a reference authentication result obtained after authentication, by each node device, on the characteristic acquisition device from the blockchain network.

An association unit 604 configured to establish the association relationship between the target client and the characteristic acquisition device in a case that the determining unit 603 determines that the characteristic acquisition device passes authentication according to the reference authentication results.

In an embodiment, a target client is any one of at least two clients, each node device provides a business service for one of the at least two clients, and after an association relationship is established between each of the at least two clients and a characteristic acquisition device, an acquisition unit 601 is further configured to:

acquire characteristic information from the characteristic acquisition device and transmit the characteristic information to any node device in a blockchain network so that any node device recognizes the characteristic information.

In an embodiment, a transmitting unit 602 is further configured to:

transmit device information to any node device in a blockchain network and acquire a device address of any node device, enable any node device to verify the characteristic acquisition device according to the device information in response to determining that an acquired device address is consistent to a preset device address, and transmit the device information to other node devices in the blockchain network after any node device finishes authentication on the characteristic acquisition device.

In an embodiment, a transmitting unit 602 is further configured to:

transmit device information to a target node device indicated by a preset device address in a blockchain network according to a repositioning policy if it is determined that an acquired device address is not consistent to the preset device address, thereby enabling the target node device to verify a characteristic acquisition device according to the device information, and transmit the device information to other node devices in the blockchain network after the target node device finishes authentication on the characteristic acquisition device.

In an embodiment, a reference authentication result obtained after authentication, by each node device, on a characteristic acquisition device includes that the characteristic acquisition device passes authentication, or does not pass authentication. The determining unit 603 is further configured to:

count a first number of target reference authentication results and determine a second number of normal node devices included in the blockchain network, where the target reference authentication results include reference authentication results for indicating that the corresponding node devices determine that the characteristic acquisition device passes authentication; and determine that the characteristic acquisition device passes authentication according to the first number and the second number.

In an embodiment, a determining unit 603 is further configured to:

determine whether a characteristic acquisition device passes authentication if a first number is equal to a second number.

In an embodiment, a determining unit 603 is further configured to:

acquire verification feedback information from a target node device, where the verification feedback information is determined according to result information fed back after other node devices authenticate a characteristic acquisition device according to device information after the target node device transmits the device information to other node devices in a blockchain network; and determine a second number of normal node devices included in the blockchain network according to the verification feedback information.

In an embodiment, a transmitting unit 602 is further configured to:

acquire the device information and a device private key of a characteristic acquisition device from the characteristic acquisition device;

perform, by using the device private key, signing treatment on the device information so as to obtain the device information carrying signature information, and transmit the device information carrying the signature information to the blockchain network.

In an embodiment, an apparatus further includes a memory unit 605.

The memory unit 605 is configured to store device information of a characteristic acquisition device in a blockchain network after it is determined that the characteristic acquisition device passes authentication.

In an embodiment, there are a plurality of pieces of device information; the memory unit 605 is further configured to:

acquire a storage location of each piece of device information in a blockchain network; and sequentially store the storage locations to obtain indexing information for inquiry of the device information of a characteristic acquisition device, and store the indexing information.

In an embodiment, an apparatus further includes an inquiry unit 606.

The inquiry unit 606 is configured to acquire indexing information of the device information in response to an inquiry operation request on device information;

determine a storage location of the device information in a blockchain network according to the indexing information of the device information; and acquire device information of a characteristic acquisition device from the blockchain network according to the indexing information of the device information if it is determined that a device signature included in the inquiry operation request is matched with a device signature in the device information.

In this embodiment of the disclosure, the acquisition unit 601 responds to the triggering operation for establishing the association relationship between the characteristic acquisition device and the target client in the at least two clients and acquire the device information of the characteristic acquisition device; the transmitting unit 602 transmits the device information to the blockchain network so that the node devices included in the blockchain network authenticate the characteristic acquisition device according to the device information; the determining unit 603 acquires the reference authentication result obtained after authentication, by each node device, on the characteristic acquisition device from the blockchain network; and the association unit 604 establishes the association relationship between the target client and the characteristic acquisition device when the determining unit 603 determines that the characteristic acquisition device passes authentication according to the reference authentication results. By implementing the above method, one characteristic acquisition device is adopted to support operation of the different clients included in the terminal, thereby reducing configurations of the characteristic acquisition device and improving convenience.

Figure 7:
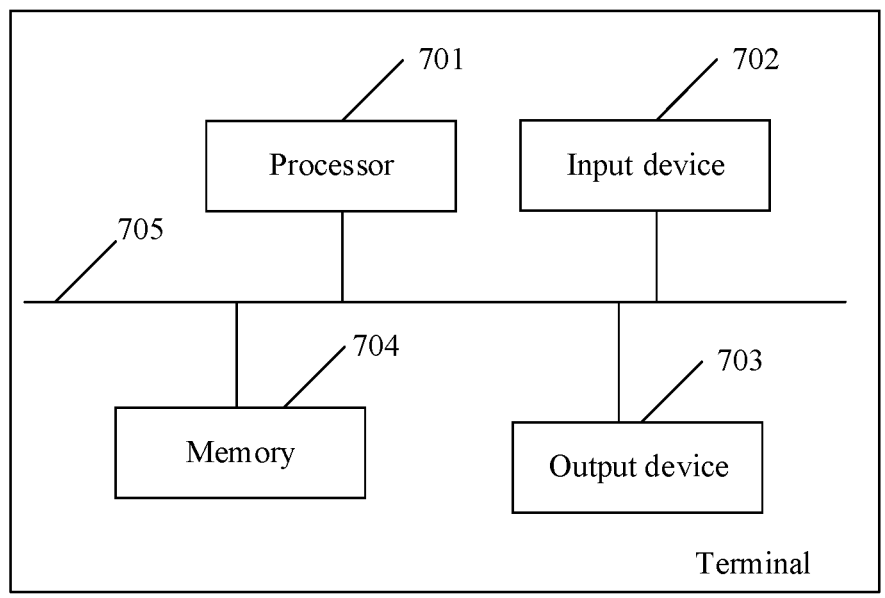
FIG. 7 is a schematic block diagram of a terminal according to an embodiment of the disclosure.

Referring to FIG. 7, FIG. 7 is a schematic structural block diagram of a terminal according to an embodiment of the disclosure. The terminal may be the above target terminal, and the terminal in the embodiment shown in FIG. 7 may include: one or more processors 701 (including processing circuitry); and one or more input devices 702, one or more input devices 702, and a memory 704 (including a non-transitory computer-readable storage medium). The processor 701, the input device 702, the output device 703, and the memory 704 are connected through a bus 705. The memory 704 is configured to store a computer program, and the computer program includes program instructions. The processor 701 is configured to execute the program instructions stored in the memory 704.

The memory 704 may include a volatile memory such as a random access memory (RAM); or the memory 704 may include a non-volatile memory such as a flash memory, a solid-state drive (SSD); or The memory 704 may alternatively include a combination of the foregoing types of memories.

The processor 701 may be a central processing unit (CPU). The processor 701 may further include a hardware chip. The foregoing hardware chip may be an application-specific integrated circuit (ASIC), a programmable logic device (PLD), or the like. The PLD may be a field programmable gate array (FPGA), generic array logic (GAL), or the like. The processor 701 may alternatively be a combination of the foregoing structures.

In this embodiment of the disclosure, the memory 704 is configured to store a computer program, the computer program including program instructions. The processor 701 is configured to execute the program instructions stored in the memory 704 to implement the steps of the corresponding method in FIG. 2 and FIG. 4.

In an embodiment, a processor 701 is configured to invoke a program instruction for executing:
  responding to a triggering operation for establishing an association relationship between a characteristic acquisition device and a target client in at least two clients, and acquiring device information of the characteristic acquisition device;
  transmitting the device information to a blockchain network so that node devices included in the blockchain network authenticate the characteristic acquisition device according to the device information;
  acquiring a reference authentication result obtained after authentication, by each node device, on the characteristic acquisition device from the blockchain network; and
  establish the association relationship between the target client and the characteristic acquisition device in response to determining that the characteristic acquisition device passes authentication according to reference authentication results.

In an embodiment, a target client is any one of at least two clients, each node device provides a business service for one of the at least two clients, and after an association relationship is established between each of the at least two clients and a characteristic acquisition device, a processor 701 is configured to invoke a program instruction for executing:
  acquiring characteristic information from the characteristic acquisition device and transmitting the characteristic information to any node device in a blockchain network so that any node device recognizes the characteristic information.

In an embodiment, a processor 701 is configured to invoke a program instruction for executing:
  transmitting device information to any node device in a blockchain network and acquiring a device address of any node device; and
  enabling any node device to verify the characteristic acquisition device according to the device information in response to determining that an acquired device address is consistent to a preset device address, and transmitting the device information to other node devices in the blockchain network after any node device finishes authentication on the characteristic acquisition device.

In an embodiment, a processor 701 is configured to invoke a program instruction for executing:
  transmitting device information to a target node device indicated by a preset device address in a blockchain network according to a repositioning policy if it is determined that an acquired device address is not consistent to a preset device address, enabling the target node device to verify a characteristic acquisition device according to the device information, and transmitting the device information to other node devices in the blockchain network after the target node device finishes authentication on the characteristic acquisition device.

In an embodiment, reference authentication results include that a characteristic acquisition device passes authentication, or does not pass authentication; and a processor 701 is configured to invoke a program instruction for executing:
  counting a first number of target reference authentication results and determining a second number of normal node devices included in a blockchain network, where the target reference authentication results include reference authentication results for indicating that the corresponding node devices determine that the characteristic acquisition device passes authentication; and
  determining that the characteristic acquisition device passes authentication according to the first number and the second number.

In an embodiment, a processor 701 is configured to invoke a program instruction for executing:
  determining whether a characteristic acquisition device passes authentication if a first number is equal to a second number.

In an embodiment, a processor 701 is configured to invoke a program instruction for executing:
  acquiring verification feedback information from a target node device, where the verification feedback information is determined according to result information fed back after other node devices authenticate a characteristic acquisition device according to device information after the target node device transmits the device information to other node devices in a blockchain network; and
  determining a second number of normal node devices included in the blockchain network according to the verification feedback information.

In an embodiment, a processor 701 is configured to invoke a program instruction for executing:
  acquiring the device information and a device private key of a characteristic acquisition device from the characteristic acquisition device; and
  performing, by the device private key, signing treatment on the device information so as to obtain the device information carrying signature information, and transmitting the device information carrying the signature information to the blockchain network.

In an embodiment, a processor 701 is configured to invoke a program instruction for executing:
  storing the device information of a characteristic acquisition device in a blockchain network in response to determining that the characteristic acquisition device passes authentication.

In an embodiment, a processor 701 is configured to invoke a program instruction for executing:
  acquiring a storage location of each piece of device information in a blockchain network; and
  sequentially storing the storage locations to obtain indexing information for inquiry of the device information of a characteristic acquisition device, and storing the indexing information.

In an embodiment, a processor 701 is configured to invoke a program instruction for executing:
  responding to an inquiry operation request for device information and acquiring the indexing information of the device information;
  determining a storage location of the device information in a blockchain network according to the indexing information of the device information; and
  acquiring device information of a characteristic acquisition device from the blockchain network according to the indexing information of the device information if it is determined that a device signature included in the inquiry operation request is matched with a device signature in the device information.

An embodiment of the disclosure provides a computer program product or a computer program. The computer program product or the computer program includes computer instructions, and the computer instructions are stored in a computer-readable storage medium. A processor of a terminal reads the computer instructions from the computer-readable storage medium and executes the computer instructions to cause the terminal to perform the method embodiments shown in FIG. 2 and FIG. 4. The computer-readable storage medium may include a magnetic disc, an optical disc, a read-only memory (ROM), a random access memory (RAM), or the like.

The foregoing descriptions are merely some embodiments of the disclosure, and are not intended to limit the scope of the disclosure. A person skilled in the art may understand all or some processes of the foregoing embodiments, and equivalent modifications made according to the claims of the disclosure shall still fall within the scope of the present disclosure.

What is claimed is:

1. A method of device management executed by a target terminal, the method comprising:
   acquiring, by processing circuitry of the target terminal, device information of a characteristic acquisition device that is associated with the target terminal in response to a triggering operation for establishing an association relationship between the characteristic acquisition device and a target client in the target terminal, the characteristic acquisition device being configured to collect characteristic information of a user of the target client, the association relationship indicating a data communication connection between the characteristic acquisition device and the target terminal, the characteristic information including biometric information of the user;
   transmitting the device information to a plurality of node devices of a blockchain network based on an address of at least one of the plurality of node devices that is indicated by the target client, authentication of the characteristic acquisition device being performed by each of the plurality of node devices in the blockchain network according to the device information;
   acquiring a respective reference authentication result generated by each of the plurality of node devices, the respective reference authentication result indicating whether the characteristic acquisition device passes the authentication by the respective node device; and
   establishing the association relationship between the target client and the characteristic acquisition device in response to the characteristic acquisition device passing the authentication according to the reference authentication results.

2. The method according to claim 1, wherein:
   the target client is one of at least two clients that are included in the target terminal,
   each of the plurality of node devices provides a business service for at least one of the at least two clients, and
   the method further comprising:
   in response to the association relationship being established between the target client and the characteristic acquisition device,
   acquiring the characteristic information from the characteristic acquisition device and transmitting the characteristic information to one of the plurality of node devices in the blockchain network such that the one of the plurality of node devices identifies the user based on the characteristic information of the user acquired from the characteristic acquisition device.

3. The method according to claim 2, wherein the transmitting further comprises:
   transmitting the device information to one of the plurality of node devices in the blockchain network and acquiring a device address of the one of the plurality of node devices;
   determining whether the acquired device address is consistent with a preset device address;
   authenticating the characteristic acquisition device based on the one of the plurality of node devices according to the device information in response to the acquired device address being consistent with the preset device address, and
   transmitting the device information to other node devices of the plurality of node devices in the blockchain network such that the other node devices of the plurality of node devices verify the characteristic acquisition device based on the device information.

4. The method according to claim 3, further comprising:
   transmitting the device information to a target node device indicated by the preset device address in the blockchain network according to a repositioning policy in response to the acquired device address being inconsistent with the preset device address;
   authenticating the characteristic acquisition device based on the target node device according to the device information; and
   transmitting the device information to other node devices different from the target node device in the blockchain network.

5. The method according to claim 4, further comprising:
   counting a first number of target reference authentication results and determining a second number of normal node devices of the plurality of node devices in the blockchain network, each of the target reference authentication results including a respective reference authentication result indicating that the characteristic acquisition device passes the authentication of a respective one of the plurality of node devices, the second number of the normal node devices indicating how many node devices of the plurality of node devices provide the reference authentication results; and
   determining whether the characteristic acquisition device passes the authentication based on the first number and the second number.

6. The method according to claim 5, wherein the determining comprises:
   determining that the characteristic acquisition device passes the authentication in response to the first number being equal to the second number.

7. The method according to claim 6, wherein the determining the second number of the normal node devices of the plurality of node devices in the blockchain network comprises:
   acquiring verification feedback information from the target node device, the verification feedback information being determined according to the reference authentication results that are fed back from the other node devices after the other node devices authenticate the characteristic acquisition device according to the device information; and
   determining the second number of the normal node devices of the plurality of node devices in the blockchain network according to the verification feedback information, the verification feedback information indicating how many node devices of the plurality of node devices provide the reference authentication results.

8. The method according to claim 1, wherein the transmitting the device information to the blockchain network comprises:
acquiring the device information and a device private key of the characteristic acquisition device from the characteristic acquisition device;
performing, with the device private key, a signing treatment on the device information so as to obtain device information carrying signature information; and
transmitting the device information carrying the signature information to the blockchain network.

9. The method according to claim 1, further comprising:
storing the device information of the characteristic acquisition device in the blockchain network in response to the characteristic acquisition device passing the authentication.

10. The method according to claim 9, wherein the device information includes a plurality of sub device information; and
the method further comprising:
acquiring a respective storage location of each of the plurality of sub device information in the blockchain network in response to the device information being stored in the blockchain network;
sequentially storing the storage locations to obtain indexing information to later find the device information of the characteristic acquisition device; and
storing the indexing information in the blockchain network.

11. The method according to claim 10, further comprising:
responsive to an inquiry request for the device information, acquiring the indexing information of the device information;
determining the storage locations of the device information in the blockchain network according to the indexing information of the device information;
determining whether a device signature in the inquiry request matches a device signature of the device information; and
acquiring the device information of the characteristic acquisition device from the blockchain network according to the indexing information of the device information in response to the device signature in the inquiry request being matched with the device signature of the device information.

12. A target terminal, the target terminal comprising:
processing circuitry configured to:
acquire device information of a characteristic acquisition device that is associated with the target terminal in response to a triggering operation for establishing an association relationship between the characteristic acquisition device and a target client in the target terminal, the characteristic acquisition device being configured to collect characteristic information of a user of the target client, the association relationship indicating a data communication connection between the characteristic acquisition device and the target terminal, the characteristic information including biometric information of the user;
transmit the device information to a plurality of node devices of a blockchain network based on an address of at least one of the plurality of node devices that is indicated by the target client, authentication of the characteristic acquisition device being performed by each of the plurality of node devices in the blockchain network according to the device information;
acquire a respective reference authentication result generated by each of the plurality of node devices, the respective reference authentication result indicating whether the characteristic acquisition device passes the authentication by the respective node device; and
establish the association relationship between the target client and the characteristic acquisition device in response to the characteristic acquisition device passing the authentication according to the reference authentication results.

13. The target terminal according to claim 12, wherein:
the target client is one of at least two clients that are included in the target terminal,
each of the plurality of node devices provides a business service for at least one of the at least two clients, and
the processing circuitry is configured to:
in response to the association relationship being established between the target client and the characteristic acquisition device,
acquire the characteristic information from the characteristic acquisition device and transmit the characteristic information to one of the plurality of node devices in the blockchain network such that the one of the plurality of node devices identifies the user based on the characteristic information of the user acquired from the characteristic acquisition device.

14. The target terminal according to claim 13, wherein the processing circuitry is configured to:
transmit the device information to one of the plurality of node devices in the blockchain network and acquire a device address of the one of the plurality of node devices;
determine whether the acquired device address is consistent with a preset device address;
authenticate the characteristic acquisition device based on the one of the plurality of node devices according to the device information in response to the acquired device address being consistent with the preset device address, and
transmit the device information to other node devices of the plurality of node devices in the blockchain network such that the other node devices of the plurality of node devices verify the characteristic acquisition device based on the device information.

15. The target terminal according to claim 14, wherein the processing circuitry is configured to:
transmit the device information to a target node device indicated by the preset device address in the blockchain network according to a repositioning policy in response to the acquired device address being inconsistent with the preset device address;
authenticate the characteristic acquisition device based on the target node device according to the device information; and
transmit the device information to other node devices different from the target node device in the blockchain network.

16. The target terminal according to claim 15, wherein the processing circuitry is configured to:
count a first number of target reference authentication results and determine a second number of normal node devices of the plurality of node devices in the blockchain network, each of the target reference authentication results including a respective reference authentication result indicating that the characteristic acquisition device passes the authentication of a respective one of the plurality of node devices, the second number of the normal node devices indicating how many node devices of the plurality of node devices provide the reference authentication results; and determine whether the characteristic acquisition device passes the authentication based on the first number and the second number.

17. The target terminal according to claim 16, wherein the processing circuitry is configured to:

determine that the characteristic acquisition device passes the authentication in response to the first number being equal to the second number.

18. The target terminal according to claim 17, wherein the processing circuitry is configured to:

acquire verification feedback information from the target node device, the verification feedback information being determined according to the reference authentication results that are fed back from the other node devices after the other node devices authenticate the characteristic acquisition device according to the device information; and determine the second number of the normal node devices of the plurality of node devices in the blockchain network according to the verification feedback information, the verification feedback information indicating how many node devices of the plurality of node devices provide the reference authentication results.

19. The target terminal according to claim 12, wherein the processing circuitry is configured to:

acquire the device information and a device private key of the characteristic acquisition device from the characteristic acquisition device;

perform, with the device private key, a signing treatment on the device information so as to obtain device information carrying signature information; and transmit the device information carrying the signature information to the blockchain network.

20. A non-transitory computer readable storage medium storing instructions which, when executed by at least one processor of a target terminal, cause the at least one processor to perform:

acquiring device information of a characteristic acquisition device that is associated with the target terminal in response to a triggering operation for establishing an association relationship between the characteristic acquisition device and a target client in the target terminal, the characteristic acquisition device being configured to collect characteristic information of a user of the target client, the association relationship indicating a data communication connection between the characteristic acquisition device and the target terminal, the characteristic information including biometric information of the user;

transmitting the device information to a plurality of node devices of a blockchain network based on an address of at least one of the plurality of node devices that is indicated by the target client, authentication of the characteristic acquisition device being performed by each of the plurality of node devices in the blockchain network according to the device information;

acquiring a respective reference authentication result generated by each of the plurality of node devices, the respective reference authentication result indicating whether the characteristic acquisition device passes the authentication by the respective node device; and establishing the association relationship between the target client and the characteristic acquisition device in response to the characteristic acquisition device passing the authentication according to the reference authentication results.

\* \* \* \* \*